Figure 4:
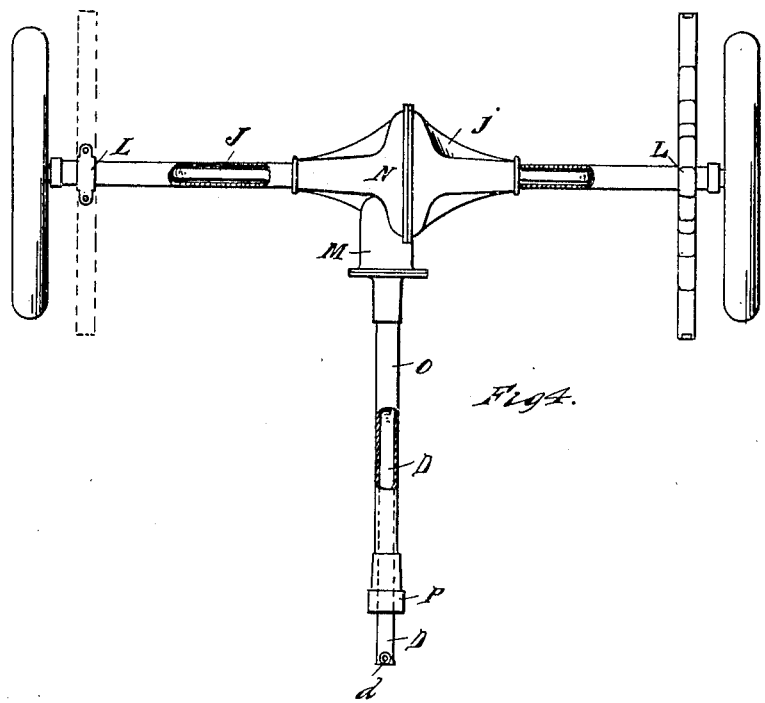

No. 857,002. PATENTED JUNE 11, 1907.
C. B. KING.
APPARATUS FOR TRANSMITTING MOTION.
APPLICATION FILED SEPT. 12, 1904.
2 SHEETS—SHEET 1.
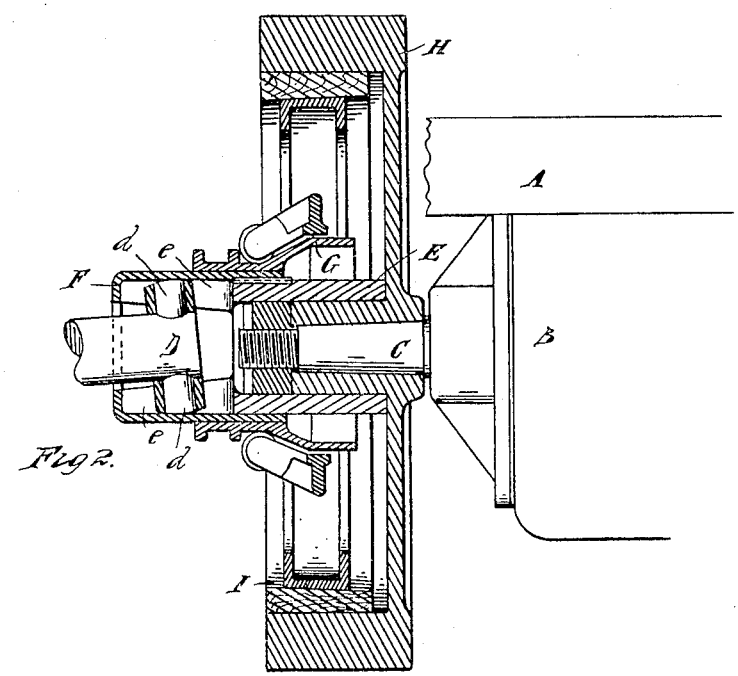
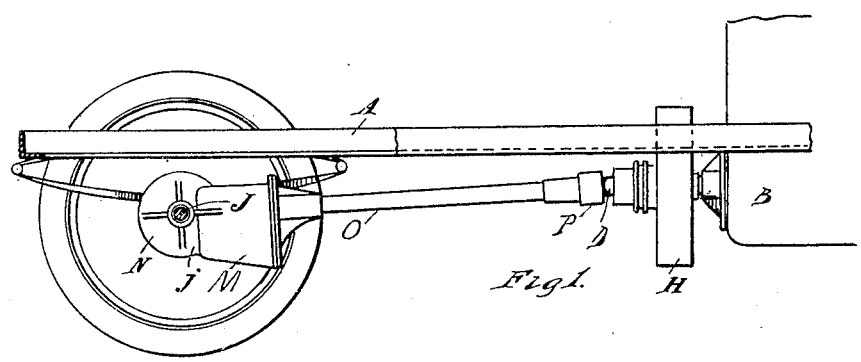
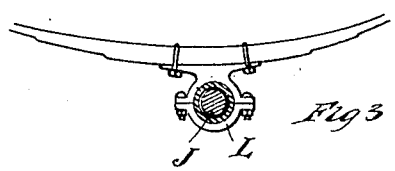
WITNESSES
J. G. Massey
C. F. Day
INVENTOR
Charles Brady King
By Parker & Burton
Attorneys.

No. 857,002. PATENTED JUNE 11, 1907.
C. B. KING.
APPARATUS FOR TRANSMITTING MOTION.
APPLICATION FILED SEPT. 12, 1904.

2 SHEETS—SHEET 2

WITNESSES
INVENTOR
Charles Brady King.
By Parker & Burton
Attorneys.

UNITED STATES PATENT OFFICE.

CHARLES BRADY KING, OF DETROIT, MICHIGAN, ASSIGNOR TO NORTHERN MOTOR CAR COMPANY, OF DETROIT, MICHIGAN, A CORPORATION OF MICHIGAN.

APPARATUS FOR TRANSMITTING MOTION.

No. 857,002.  Specification of Letters Patent.  Patented June 11, 1907.

Application filed September 12, 1904. Serial No. 224,058.

*To all whom it may concern:*

Be it known that I, CHARLES BRADY KING, a citizen of the United States, residing at Detroit, county of Wayne, State of Michigan, have invented a certain new and useful Improvement in Apparatus for Transmitting Motion; and I declare the following to be a full, clear, and exact description of the same, such as will enable others skilled in the art to which it pertains to make and use the same, reference being had to the accompanying drawings, which form a part of this specification.

My invention relates to apparatus for transmitting motion of the engine shaft to the driving shaft of an automobile.

Referring to the accompanying drawings,—Figure 1, is a side elevation partly in section, of a part of an automobile, embodying my invention. Fig. 2, is a detail elevation, partly in section, of the fly-wheel, crank-case, part of the frame, the transmission shaft, and the joint connecting it to the main shaft of the engine. Fig. 3, is a detail elevation showing one of the bearings of the driving axle. Fig. 4, is a plan view showing the rear or driving axle, the casing therefor, a part of the transmission shaft and the casing therefor; the parts being broken away to show the interior construction.

Similar letters refer to similar parts.

My invention is shown in the drawings embodied in an automobile using the bevel gear transmission the details of which are well known to those conversant with the art and will therefore only be described so far as is necessary or convenient to the understanding of my invention.

A, is the automobile frame.

B, is the crank case of the engine. The engine is secured rigidly to the frame A.

C, is the main shaft of the engine. D, is the transmission shaft. Upon the shaft C, is rigidly secured the fly-wheel H, and upon the hub of the fly-wheel H, in this instance, is a sleeve E, extending beyond the hub of said fly-wheel and beyond the shaft C, and provided with opposite longitudinally extending slots $e$, $e$, in that part of the sleeve E, which projects beyond the hub of the fly-wheel and shaft C.

The sleeve E, may normally turn independently of the hub of the fly-wheel, but is restrained from longitudinal movement relative thereto. The end of the transmission shaft D, extends into the hub of the sleeve E, and said shaft is here provided with laterally extending lugs, $d$, $d$, which extend up into and are fitted to move in the slots $e$, $e$, thus forming a universal joint between the two shafts. The outer ends of the lugs, $d$, $d$, are formed in the surface of a sphere, whose center is at the center of the shaft D. F, is a sleeve keyed to and surrounding the sleeve E, and adapted to restrain the relative motion of the shaft D, by contacting the ends of the lugs, $d$, $d$. G, is a conical sleeve adapted to slide longitudinally upon the sleeve F.

The clutch is operated in a well understood manner and engages the brake surface I, on the fly-wheel H, to connect the sleeve E, with such fly-wheel to prevent angular motion of the one relative to the other. N, is a casing for the balance gearing, which casing extends laterally and forms an enveloping case $j$, for the rear or driving shaft J, of the vehicle, which case is pivoted in the main bearings L.

M, is the casing of the change speed gear, which casing forms an extension and an integral portion of the casing N. O, is a tubular projection forming an integral portion of the casing M, and extending therefrom and inclosing the transmission shaft. The casing O, has its outer end P, at or near the joint between the transmission shaft D, and the stub shaft C.

It will be observed that the universal joint is sufficient to resist the re-action from the driving torque; that connection is made immediately between the transmission shaft and the main shaft of the engine, dispensing with auxiliary shafts, and reducing the number of parts, and that a portion of the universal joint is connected to and disconnected from the engine shaft by the clutch. The tubular construction $j$, N, M, O, P, serves to stiffen the driving mechanism, and to resist the binding action of the re-action from the driving torque, while, as it is pivoted in bearings, it permits of a relative motion of engine and driving axle. The tubular construction having the change speed gear case as an integral part thereof, said gear case having the sleeve extending therefrom, forms a convenient and strong construction and maintains all the bearings accurately in line.

What I claim is:

In an automobile having transmission apparatus of the bevel-gear type, the combination of a motor having a main shaft, a sleeve upon said main shaft provided with a longitudinally extending slot, the transmission shaft having one end extending into said sleeve and provided with a laterally extending pin projecting into said slot, a sleeve surrounding said slotted sleeve and contacting the end of said pin and means for clutching said slotted sleeve to the main shaft and unclutching the same.

In testimony whereof, I sign this specification in the presence of two witnesses.

CHARLES BRADY KING.

Witnesses:
THOMAS G. MASSEY,
LOTTA LEE HAYTON.